(12) United States Patent
Haas

(10) Patent No.: US 6,360,445 B1
(45) Date of Patent: Mar. 26, 2002

(54) STRING LINE WEIGHT

(76) Inventor: Charles R. Haas, Brite Stripe Co., 1111 Hopewell Rd., Downingtown, PA (US) 19335

( * ) Notice: Subject to any disclaimer, the term of this patent is extended or adjusted under 35 U.S.C. 154(b) by 0 days.

(21) Appl. No.: 09/524,786

(22) Filed: Mar. 13, 2000

Related U.S. Application Data

(60) Provisional application No. 60/130,329, filed on Apr. 21, 1999.

(51) Int. Cl.⁷ .................................................. B43L 7/00
(52) U.S. Cl. .............................. 33/16; 33/1 LE; 33/413
(58) Field of Search ....................... 33/1 G, 1 H, 1 LE, 33/404, 405, 413, 756, 521

(56) References Cited

U.S. PATENT DOCUMENTS

| 374,684 A | 12/1887 | Lambert | |
|---|---|---|---|
| 2,502,807 A | 4/1950 | Temmer | |
| 3,115,726 A | 12/1963 | Sayles | |
| 3,171,210 A | * 3/1965 | Kundel | 33/413 |
| 4,099,354 A | 7/1978 | Depirro | |
| 4,141,146 A | * 2/1979 | Broom | 33/413 |
| 4,275,535 A | 6/1981 | Stalzer | |
| 4,921,507 A | * 5/1990 | Beyer | 33/1 LE |
| 5,022,158 A | * 6/1991 | Beyer | 33/1 LE |
| 5,036,874 A | * 8/1991 | Lynch | 33/1 G |
| 5,649,690 A | 7/1997 | Kilmer | |
| 5,873,174 A | * 2/1999 | Kraft | 33/770 |

FOREIGN PATENT DOCUMENTS

| GB | 581915 | 11/1946 |
|---|---|---|
| GB | 749076 | 5/1956 |

* cited by examiner

Primary Examiner—Christopher W. Fulton
(74) Attorney, Agent, or Firm—Richard C. Litman

(57) ABSTRACT

A portable weight for anchoring a line or string being used as a guide for marking pavement or for other construction type activities is disclosed. The portable weight includes a base made of a top plate and a bottom plate. A plurality of spikes project from the bottom surface of the bottom plate, with the heads of the spikes being held between the top and bottom plates. The top and bottom plates are bolted together. A T-shaped handle projects from the top surface of the top plate. An eye-bolt is fixed to the bottom plate and at least in part provides for the attachment of a string to the portable weight.

6 Claims, 3 Drawing Sheets

STRING LINE WEIGHT

CROSS-REFERENCE TO RELATED APPLICATION

This application claims the benefit of U.S. Provisional Patent Application Ser. No. 60/130,329, filed Apr. 21, 1999.

BACKGROUND OF THE INVENTION

1. Field of the Invention

The present invention relates generally to tethered anchors or alignment markers. More specifically, the invention is a line anchor for marking pavement, setting a chalk line, etc.

2. Description of the Related Art

In the construction field it is often necessary to provide a taut string or line to be used, for example, as a guide in marking pavement or as a guide when performing an excavating operation. Such lines are generally anchored using heavy weights, stakes driven into the ground, or batter boards. However, it has been found that making the anchor portable offers a great advantage in that the guide line setup can be moved from one location to the next with little or no wasted time. As described hereinbelow a number of conventional devices for anchoring a line or tether has been devised with varying structural features.

For example, U.S. Pat. No. 374,684, issued to Henry E. Lambert on Dec. 13, 1887, shows a fence post having a ground penetrating portion. The ground penetrating portion consist of at three pronged base with a fence-post fixedly attached thereto.

U.S. Pat. No. 2,502,807, issued to Joseph Temmer on Apr. 4, 1950, shows also a ground penetrating stake which is adapted for tethering an animal. A single stake includes the attachment of a substantially triangular bar member. The bar member is rotably fixed thereto, and includes a hook portion for securing a leash.

U.S. Pat. No. 3,115,726, issued to James Norman Sayles on Dec. 31, 1963, shows a screed chair support having ground penetrating portions, for supporting a screeding frame. This device consists of a generally square shape metal plate through which are five apertures. One large aperture is formed in the geometrical center of the plate through which a height adjusting worm screw freely or threadedly operates. Each other aperture is disposed thereabout as corner poits of a square for insertably receiving screed chair leg portions. The object of this arrangement is to stabilize the plate to prevent undesirable settling of the screed chair in soft soil or freshly poured concrete.

U.S. Pat. No. 4,099,354, issued to Mario Louis DePirro on Jul. 11, 1978, discloses a post footing form holder and stabilizer with legs designed for supporting a cylindrically shaped channel or post for conveying concrete to a footing of the post. A post system of a different sort is disclosed in the U.S. Pat. No. 5,649,690, issued to Willis G. Kilmer on Jul. 22, 1997 which shows a movable fence post anchored by stakes driven into the ground.

U.S. Pat. No. 4,275,535, issued to Kenneth R. Stalzer on Jun. 30, 1981, discloses a base member having apertures for accommodating a lath and a stake employed for locating lines. The base member has a bore for accommodating a spike which is used for hard surfaces.

United Kingdom Patent Specification Number 581,915, by Ralph Sandwith Wyrill, dated Oct. 29, 1946, shows a fence post base having a corkscrew shaped ground penetrating member.

United Kingdom Patent Specification Number 749,076, by Wolseley Engineering Limited, dated May 16, 1956, shows a fence post having a ground penetrating member.

A line anchor weight being marketed under the name BIG FOOT™ (origin unknown) includes a heavy base having a handle. The BIG FOOT™ weight lacks the spikes of the present invention.

None of the above inventions and patents, taken either singly or in combination, is seen to describe the instant invention as claimed. In particular, none of the above references is seen to teach or suggest the unique structure and advantageous features of the portable line anchor weight of the present invention.

SUMMARY OF THE INVENTION

The present invention is directed to a portable weight for anchoring a line or string being used as a guide for marking pavement or being used for other construction type activities. The portable weight includes a base made of a top plate and a bottom plate. A plurality of spikes project from the bottom surface of the bottom plate, with the heads of the spikes being held between the top and bottom plates. The top and bottom plates are bolted together. A T-shaped handle projects from the top surface of the top plate. An eye-bolt is fixed to the bottom plate and at least in part provides for the attachment of a string to the portable weight.

Accordingly, it is a principal object of the invention to provide a weight for anchoring a string which is portable.

It is another object of the invention to provide a weight for anchoring a string which has spikes projecting from the bottom thereof such that the weight can be lighter than would otherwise be permissible for remaining stationary even as the string is drawn tight.

It is a further object of the invention to provide a weight for anchoring a string which has spikes projecting from the bottom thereof, wherein these spikes are easily replaceable.

Still another object of the invention is to provide a weight for anchoring a string, the weight having a handle which is positioned such that the handle can conveniently be grasped by a user without the user having to bend excessively.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
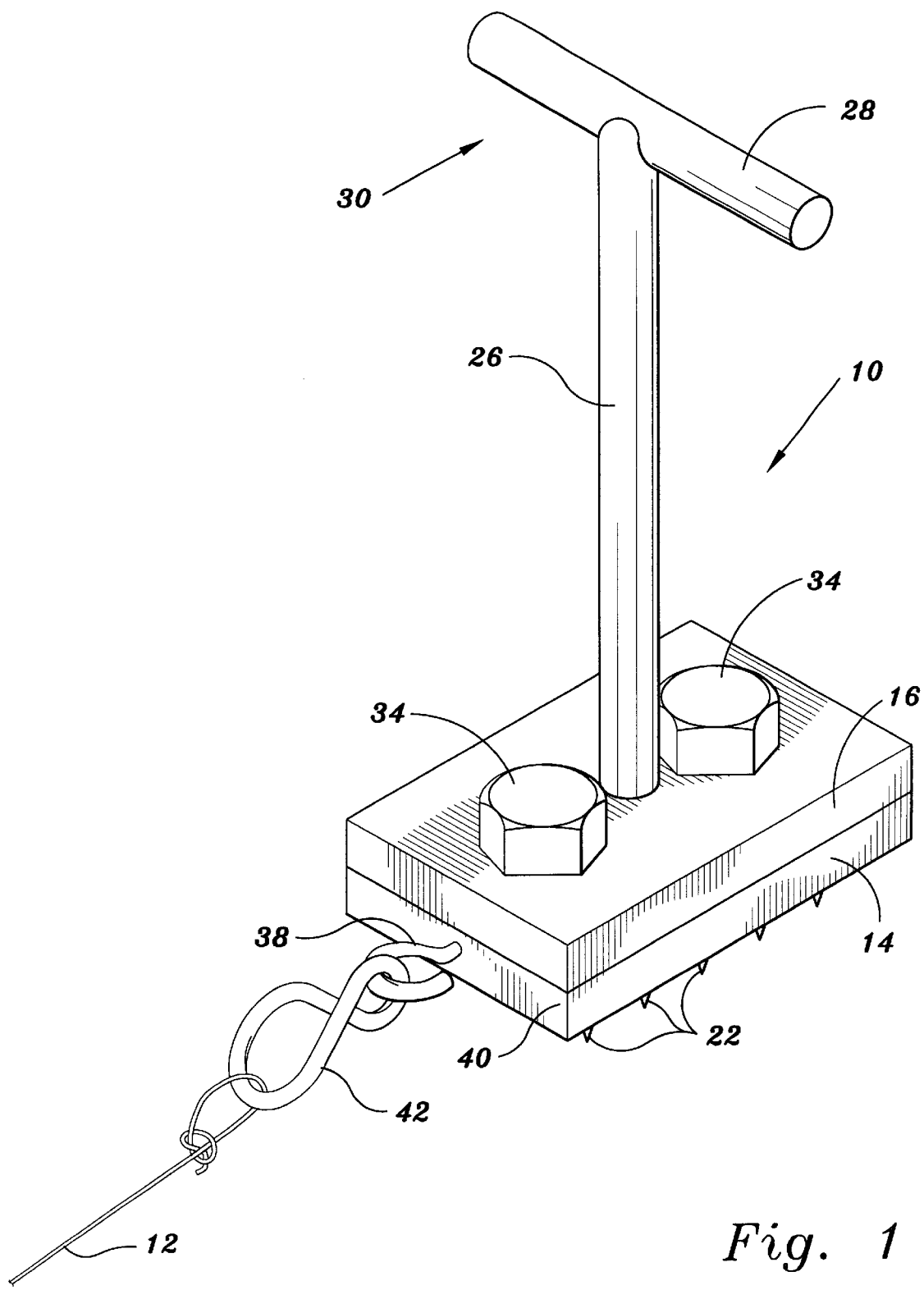
FIG. 1 is an environmental, perspective view of a string line weight according to the present invention.
Figure 2:
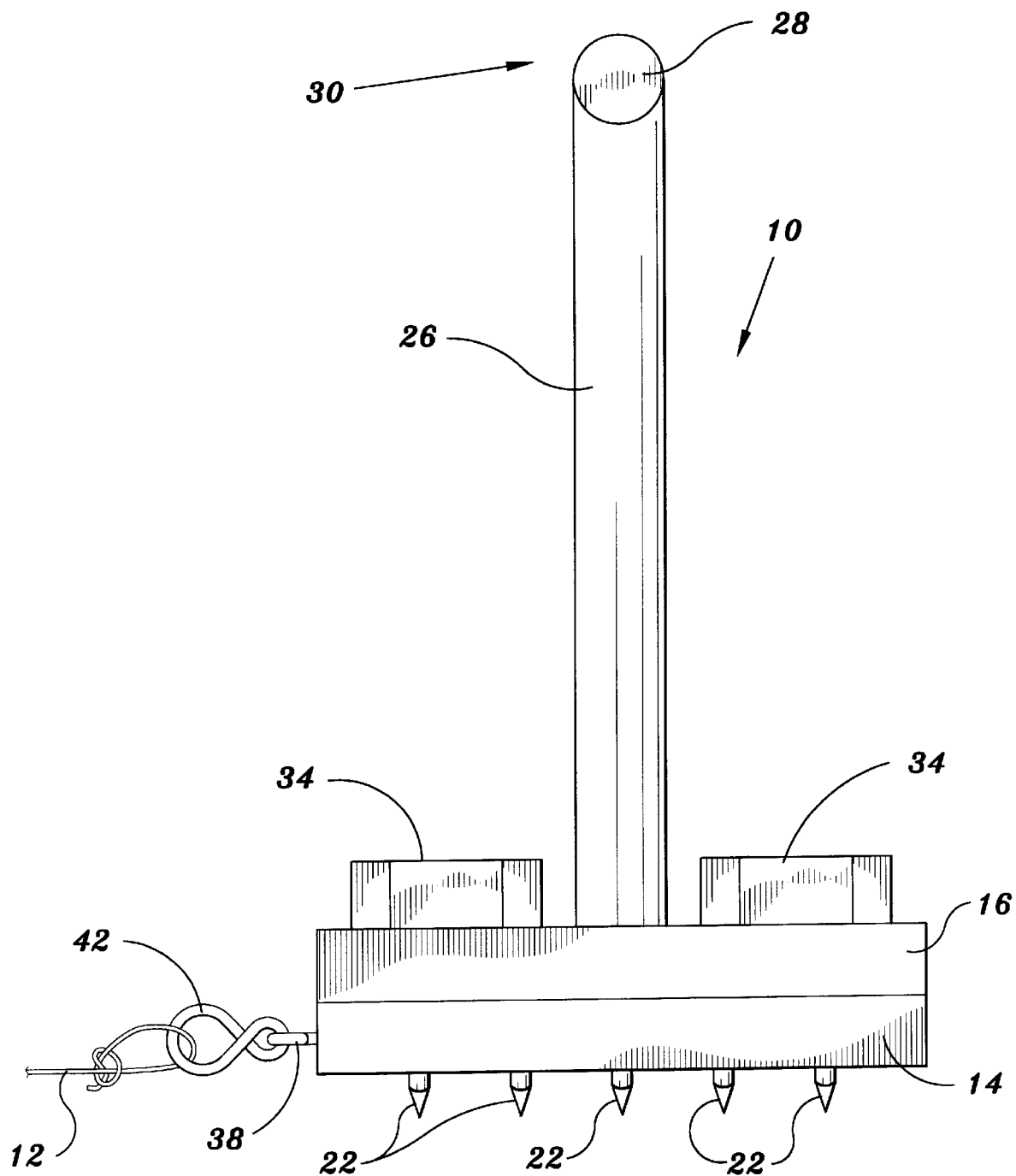
FIG. 2 is a view of a string line weight according to the present invention shown in side elevation.
Figure 3:
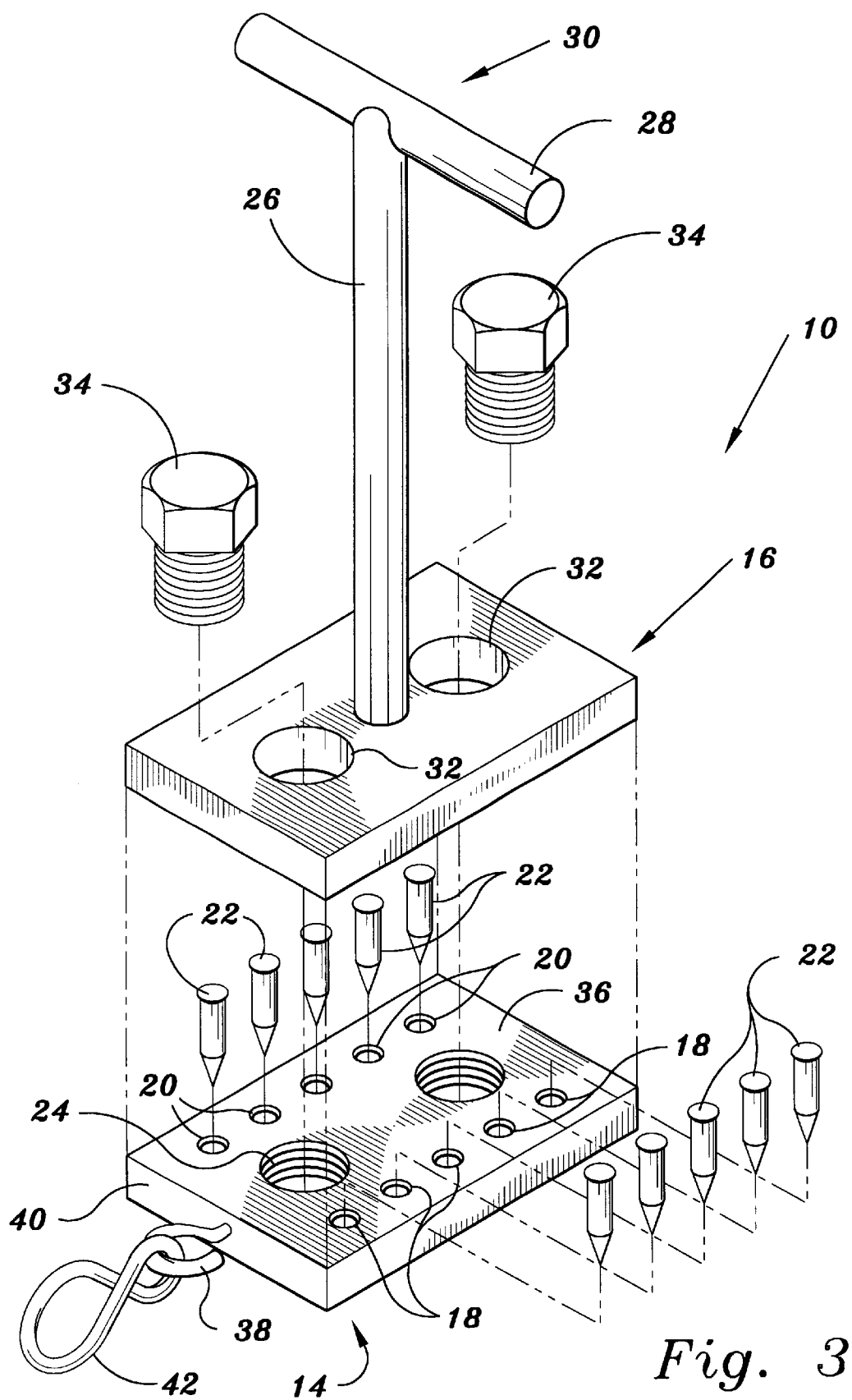
FIG. 3 is an exploded view of a string line weight according to the present invention.

The present invention is directed to a portable weight 10 for anchoring a line or string 12 being used as a guide for marking pavement or for other construction type activities such as laying a chalk line. The weight 10 includes a bottom plate 14 and a top plate 16 which provide the greater portion of the heft of the weight 10. The top and bottom plates 14 and 16 are rectangular in plan view.

The bottom plate 14 has two parallel rows of through holes 18 and 20. Each of the rows of holes 18 and 20 is distributed along the length of the bottom plate 14. Each of the through holes 18 and 20 passes through the thickness of the bottom plate 14 and is dimensioned so as to allow sufficient clearance for the passage of the shaft of a respective one of the plurality of nails 22. The nails 22 are preferably ¾ inch masonry spikes. A pair of threaded holes 24 also passes through the thickness of the bottom plate 14.

The top plate 16 has a shaft 26 projecting perpendicularly from the top surface of the top plate 16. The shaft 26 may be fixed to the top plate 16 by any well known method including welding. Alternatively, the shaft 26 and the top plate 16 may be made in one piece, or the shaft 26 may be secured to the top plate 16 by being engaged to a threaded hole in the top plate 16. A bar 28 is fixed to the end of the shaft 26, distal from the top plate 16, to form a T-shaped handle 30. The length of the shaft 26 is selected such that the T-shaped handle 30 can readily be grasped by a user without the user having to bend excessively. Preferably, the length of the shaft 26 is selected such that the T-shaped handle 30 is at a height between the knee to the hip of the user.

Two holes 32 extending through the thickness of the top plate 16 are provided on either side of the shaft 26. The holes 32 provide sufficient clearance for the threaded shafts of the bolts 34 to pass therethrough. To assemble the weight 10, each of the plurality of nails 22 is placed through a respective one of the plurality of holes 18 and 20. The top plate 16 is then superimposed upon the bottom plate 14 with the threaded holes 24 being in registry with the holes 32. The plurality of holes 18 and 20 are counter sunk such that the heads of the nails 22 will be flush with the top surface 36 of the bottom plate 14. The top plate 16 is then brought into contact with the bottom plate 14. Hex-head bolts 34 are then engaged to the threaded holes 24, with their shafts passing through the holes 32, and the bolts 34 are then tightened to secure the top and bottom plates 16 and 14 together. Because the heads of the nails 22 are flush with the top surface 36 of the bottom plate 14, the top and bottom plates 16 and 14 will contact each other with no gaps therebetween, when the bolts 34 are tightened.

An eye-bolt 38 is fixed to the front face 40 of the bottom plate 14 such that the eye of the eye-bolt projects from the front face of the bottom plate 14. A figure eight-shaped swivel 42 is engaged to the eye-bolt 38. The figure eight swivel 42 is formed by pinching the ends of an S-hook shut so as to form a figure eight with a first and a second eye adjacent to one another. The first eye of the figure eight swivel is interlocked with the eye of the eye-bolt 38. A string or line 12 is tied to the second eye of the figure eight swivel 42.

The weight 10 can be lifted and carried using the T-shaped handle 30. The weight 10 can be positioned at any desired location and the string 12 is then stretched in a straight line to, for example, provide a straight guide line for painting a straight stripe on pavement as would be required for delineating the parking spaces in a parking lot. The weight 10 must remain stationary while allowing enough force to be applied to the string or line 12 such that the line is drawn tight. The nails 22 grip the ground, thus allowing the weight 10 to be lighter than it would otherwise have to be in order to resist any movement due to the forces normally applied to the string 12. The weight 10 of the present invention has a weight of about 16 lbs as compared to a weight of 19 lbs for the base portion alone of the currently available weight. In the course of ordinary use, the points of the nails 22 will eventually wear out. The design of the weight 10 of the present invention allows the nails 22 to be easily replaced.

It is to be understood that the present invention is not limited to the sole embodiment described above, but encompasses any and all embodiments within the scope of the following claims.

I claim:

1. A portable weight for anchoring a string, the portable weight comprising:

a base having a predetermined mass and a bottom surface, wherein said base is formed by a bottom plate and a top plate stacked atop said bottom plate, said top plate being secured to said bottom plate by a pair of bolts, wherein said bottom plate has a plurality of holes corresponding in number to said plurality of spikes, and wherein said plurality of spikes are a plurality of nails each having a head and a shaft, said head of each of said plurality of nails being held in place by positioning of said top plate adjacent said bottom plate with said shaft of each of said plurality of nails extending through said bottom plate and projecting from said bottom surface of said base;

a plurality of spikes projecting from said bottom surface of said base; and a handle fixed to said base.

2. The portable weight according to claim 1, wherein said top plate has a top surface and said handle is a T-shaped projecting from said top surface of said top plate.

3. The portable weight according to claim 2, wherein said bottom plate has a front surface and the portable weight further includes an eye-bolt projecting from said front surface of said bottom plate.

4. A portable weight for anchoring a string or line, the portable weight comprising: in combination with the line a base having a predetermined mass and a bottom surface, wherein said base is formed by a bottom plate and a top plate stacked atop said bottom plate, said top plate being secured to said bottom plate by a pair of bolts, wherein said bottom plate has a plurality of holes corresponding in number to said plurality of spikes, and wherein said plurality of spikes are a plurality of nails each having a head and a shaft, said head of each of said plurality of nails being held in place by positioning of said top plate adjacent said bottom plate with said shaft of each of said plurality of nails extending through said bottom plate and projecting from said bottom surface of said base;

a plurality of spikes projecting from said bottom surface of said base; and a handle fixed to said base.

5. The portable weight according to claim 4, wherein said top plate has a top surface and said handle is a T-shaped projecting from said top surface of said top plate.

6. The portable weight according to claim 5, wherein said bottom plate has a front surface and the portable weight further includes an eye-bolt projecting from said front surface of said bottom plate.

* * * * *